W. W. HERRING.
SAFETY DEVICE FOR MOTOR VEHICLES.
APPLICATION FILED AUG. 23, 1915.
1,236,709.
Patented Aug. 14, 1917.
2 SHEETS—SHEET 2.
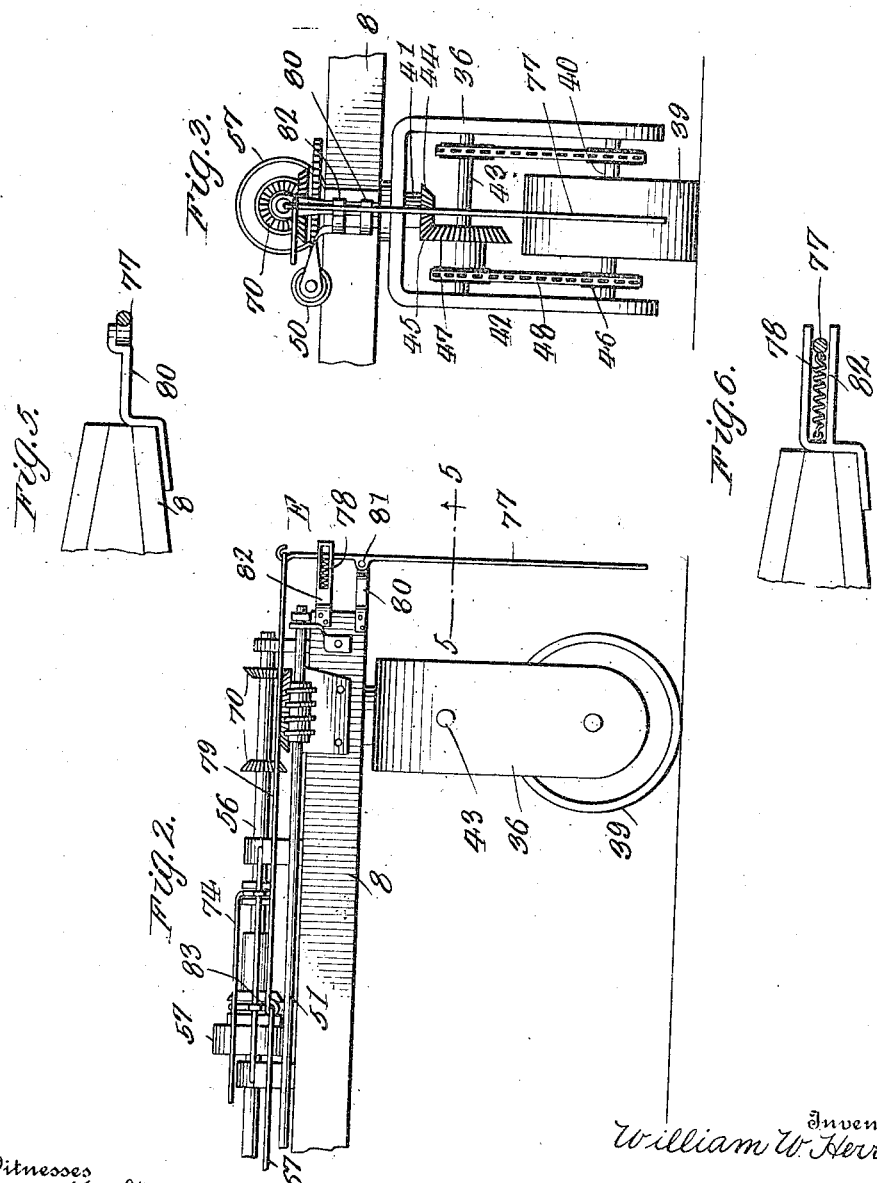
Witnesses
Guy M. Spring
C. Everett Lancaster
Inventor
William W. Herring
By Richard B. Owen,
Attorney

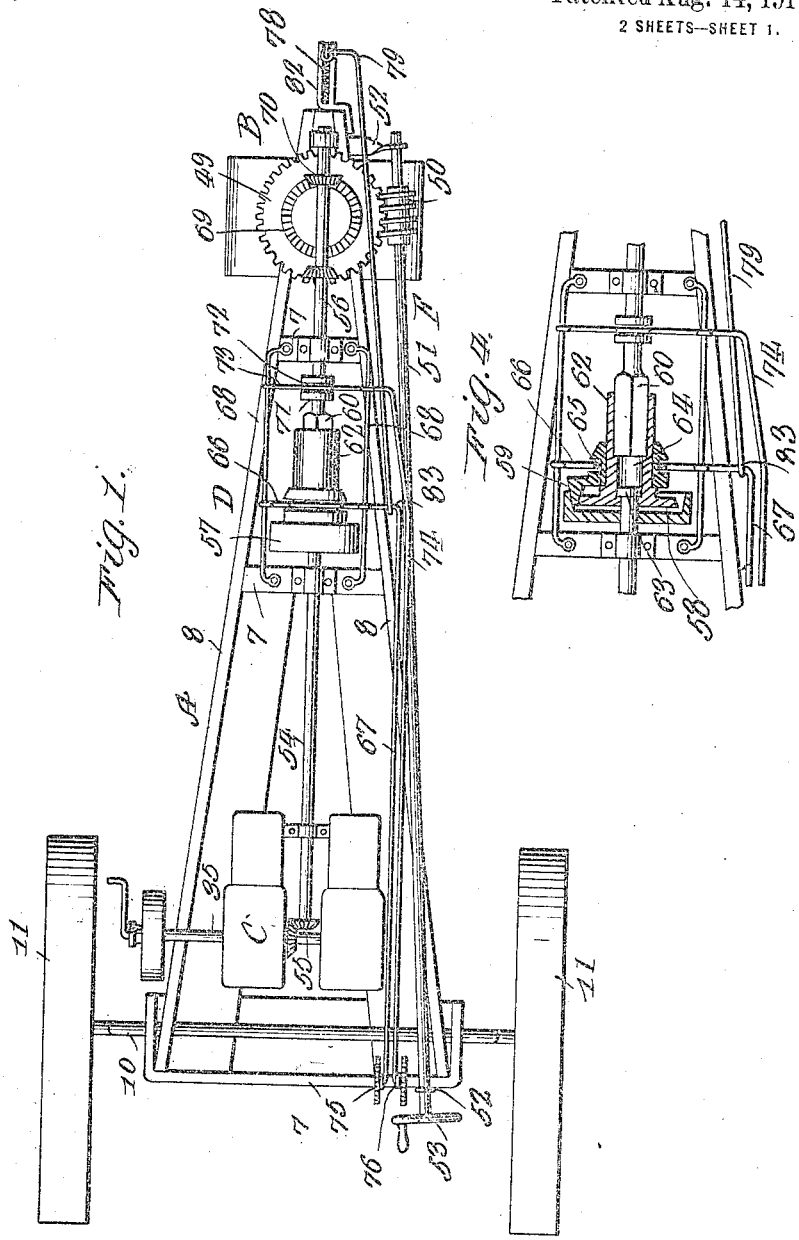

UNITED STATES PATENT OFFICE.

WILLIAM W. HERRING, OF SHAWNEE, OKLAHOMA.

SAFETY DEVICE FOR MOTOR-VEHICLES.

1,236,709. Specification of Letters Patent. Patented Aug. 14, 1917.

Application filed August 23, 1915. Serial No. 46,930.

*To all whom it may concern:*

Be it known that I, WILLIAM W. HERRING, a citizen of the United States, residing at Shawnee, in the county of Pottawatomie and State of Oklahoma, have invented certain new and useful Improvements in Safety Devices for Motor-Vehicles, of which the following is a specification.

My present invention relates to safety devices for motor vehicles more particularly adapted for use on agricultural machinery, such as is disclosed in my co-pending application for patent filed January 10, 1913, and bearing Serial No. 741,352.

The principal object of my invention is to provide a safety device whereby the mechanism for the transmission of power to the ground wheels of the vehicle may be rendered inoperative, should the vehicle encounter obstructions of unusual magnitude, such as rocks, stumps, or embankments.

Other objects of the invention will appear in the following detailed description, taken in connection with the accompanying drawings, forming a part of this specification, and in which drawings:—

Figure 1 is a plan view of a traction engine embodying my invention.

Fig. 2 is a fragmentary side elevation, partly broken away to disclose details.

Fig. 3 is a front elevation of a portion of a traction engine, showing the power wheels thereof.

Fig. 4 is a plan view partly in longitudinal section disclosing details of gearing and forming a part of the transmission.

Fig. 5 is a sectional view on the line 5—5 looking in the direction of the arrow.

Fig. 6 is a detailed plan view of a guide for a trip member which engages the obstruction.

In the drawing, where similar characters refer to similar parts, A designates a suitable frame including transverse members 7 and longitudinally extending elongated members 8, preferably symmetrically disposed with respect to the longitudinal axis of the frame, and forming a beam. Extending longitudinally of the members 7, and carried by frame A, is a dead axle 10 supporting wheels 11, which constitute the main supporting wheels of the chassis of the machine. Adjacent the end of the beam formed by members 8, opposite members 7, I provide transmission and steering mechanism, designated generally by B, and to be subsequently more specifically described.

The frame A carries the motor C, preferably an internal combustion engine, having a drive shaft 35, conveniently disposed with its axis parallel to the axis of axle 10.

Referring now to mechanism B, more specifically shown in Fig. 3 of the drawing, it comprises a fork 36, having an upright axis of oscillation; a wheel 39 rotatably carried by fork 36 and oscillatable therewith as through axle 40, a shaft 41 extending through the upper portion of fork 36; and, mechanism 42 for imparting rotation to the wheel 39 through shaft 41. The mechanism 42 preferably comprises a shaft 43, carried by fork 36, with its axis parallel to the axis of axle 40; co-meshing bevel gears 44 and 45 carried by shafts 41 and 43, respectively; a sprocket wheel 46 rigid with axle 40; sprocket wheel 47 rigid with shaft 43; and, endless sprocket chains 48, trained about sprocket wheel 46 and 47. Thus, mechanism 42 provides positive means for imparting movement of shaft 41 to wheel 39.

Steering means F may be provided to oscillate fork 36, and as disclosed includes a worm gear 49 rigid with fork 36; a worm 50 for co-action therewith; a shaft 51 carrying worm 50 and supported by bearings 52; and, a hand wheel 53 facilitating rotation of shaft 51. By this construction, it is to be noted that the fork 36 may oscillate freely about the axis of shaft 41, without affecting the transmission mechanism 42.

The character D designates generally, transmission control mechanism and includes, in combination with a shaft 54, receiving its movement as through co-meshing bevel gears 55, from shaft 35, this shaft 54 extending longitudinally of the beam of frame A, and a revoluble and longitudinally movable shaft 56 axially alined with shaft 54; of a clutch member 57 rigid with shaft 54; a co-acting clutch member 58, circumferentially movable with shaft 56 but axially movable thereon; and, a wedge member 59 slidable upon clutch member 58, and adapted to impart movement of member 57 to member 58, when engaging the two. The means for coupling member 58 to be circumferentially movable with shaft 56, may be by providing the latter with an end 60 polygonal in cross section, and received by a socket 62 of similar section in member 58.

Movement of member 58, in a direction longitudinally of shaft 56 may be limited by providing a head 63 on shaft 54, said head being received by recess 64 in member 58.

As means for moving wedge member 59 into and out of engagement with clutch members 57 and 58, I provide a circumferentially extending groove 65 in member 59, which groove receives an angle extension 66 of a rod 67. The angle extension 66 may be guided by embracing parallel rods 68, in parallelism to coaxial shafts 54 and 56. Thus, by drawing rod 67 toward the operator, the wedge member 59 is so disposed that circumferential movement of member 57 is imparted to member 58, and consequently to shaft 56.

The shaft 41 of mechanism B carries a gear 69, while shaft 56, which is disposed with its axis transversely with respect to the axis of shaft 41, carries gears 70, either of which co-mesh with gear 69 to impart movement of shaft 56 to shaft 41. With this end in view, the shaft 56 is reciprocable, and may carry a collar 71 rigid therewith provided with an annular groove 72. The embracing portions 73 of rod 74 may extend into groove 72, these embracing portions being guided by rods 68. The rods 67 and 74 may be independently connected to levers 75 and 76, respectively. Thus, by oscillating lever 76, the shaft 56 may be retained against longitudinal movement with either of the gears 70 meshing with gear 69, according to the direction of rotation it is desired to impart to wheel 39.

Referring now to the auxiliary or safety control mechanism for the transmission, designated generally by E, it comprises a trip member 77, disposed in front of the ground wheel 39 and is normally projected as by tension spring 78, and a rod 79 operatively connects trip member 77 with angle extension 66, so that when trip member 77 is moved from normal position, this extension throws wedge member 59 out of contact with co-acting clutch members 57 and 58. The trip member 77 may consist of a rod pivoted to main beam as by bracket 80 intermediate its length, as at 81. The upper end of this trip member extends through a bracket 82, accommodating spring 78 so that this spring has a tendency to draw the upper end of the rod toward mechanism D. The rod 79 is pivoted to the upper end of member 77, and is preferably looped about extension 66 as at 83, so as to not interfere with the free movement of said extension through actuation of rod 67. It is to be noted that, when the member 77 encounters an obstacle of considerable magnitude, the rod 79 is drawn forward so that mechanism D is rendered inactive as motion transmitting means.

It is of course to be understood that I have herein disclosed a preferred form of clutch mechanism, however, any suitable device may be interposed between the power and transmission shaft, whereby, upon actuation of the trip member 77 from a normal position will render the transmission from the motor to the power ground wheel 39 inoperative.

The operation of the machine is as follows:—

Assuming that the motor C has been put into action, the shaft 54 is revolved; by manipulation of lever 76, the shaft 56 may be retained against longitudinal movement so that one of its gears 70 co-mesh with gear 69, according to the direction of movement it is desired to impart to the chassis. By its manipulating lever 75, the wedge member 59 may be actuated to couple members 57 and 58, so that circumferential movement is imparted to shaft 56, whereupon the wheel 39 is rotated. By manipulation of the hand wheel 53, the worm 50 may be rotated to oscillate the fork 36, about its upright axis, thereby steering the machine.

Should the traction engine be guided in such a direction as to encounter an obstacle of considerable magnitude, such as an embankment, before the ground wheel 39 reaches such, the trip member 77 will engage the obstacle and expanding spring 78, draw on rod 79 which, being operatively connected with the clutch of transmission D will render the clutch members inactive as motion transmitting elements. To reverse the direction of movement of the traction engine, the engine is then stopped, the rod 79 disengaged from the upper end portion of the trip member 77, and lever 76 actuated, moving shaft 56 longitudinally until gear 70 meshes with coaxial gear 69 to impart movement to ground wheel 39 in a direction other than that in which it has been moving. Since a vehicle of this kind does not travel at a great rate of speed, its momentum is not sufficient to carry the vehicle very far after the transmission has been rendered inoperative.

Changes in details may be made without departing from the spirit or scope of my invention: but,

I claim:

1. In a safety device for motor vehicles, the combination with a chassis, a motor carried thereby and transmission including a clutch for releasably imparting movement from said motor to a ground wheel of said chassis; of a trip member disposed at one end of said chassis, means operatively connecting said trip member with said clutch whereby movement of said trip member toward said chassis will disengage said clutch, a guide for said trip member including two arms one on each side of said trip member, and a spring between said arms for yieldably disposing said trip member forwardly with said clutch in an operative position for transmitting movement to said ground wheel.

2. In a safety device for motor vehicles, the combination with a chassis having two rear ground wheels and a single foremost ground wheel, a motor carried by said chassis, transmission including a clutch for imparting movement of said motor to said foremost ground wheel, and means including a rod having an arm operatively connected to said clutch whereby the latter may be thrown into or out of operation as a part of said transmission by reciprocation of said rod longitudinally of said chassis, of a trip member pivoted intermediate its ends to said chassis, one end depending in front of said foremost ground wheel, a second rod pivotally carried by said trip member above said pivotal connection and operatively connected with the said arm, and means for normally positioning said trip member with its lower end remote from said foremost ground wheel when said clutch is operating as a part of said transmission.

In testimony whereof I have affixed my signature in presence of two witnesses.

WILLIAM W. HERRING.

Witnesses:
L. C. ELSTON,
R. L. AUSTIN.